(12) United States Patent
Ogawa et al.

(10) Patent No.: US 11,267,990 B2
(45) Date of Patent: Mar. 8, 2022

(54) METHOD FOR MANUFACTURING FLEXIBLE PACKAGING FILM

(71) Applicant: DIC Corporation, Tokyo (JP)

(72) Inventors: Masahiko Ogawa, Tokyo (JP); Shigekazu Takahashi, Tokyo (JP); Choichi Takada, Tokyo (JP); Naoki Ichimura, Tokyo (JP)

(73) Assignee: DIC Corporation, Tokyo (JP)

( * ) Notice: Subject to any disclaimer, the term of this patent is extended or adjusted under 35 U.S.C. 154(b) by 662 days.

(21) Appl. No.: 16/316,110

(22) PCT Filed: Aug. 29, 2017

(86) PCT No.: PCT/JP2017/030888
§ 371 (c)(1),
(2) Date: Jan. 8, 2019

(87) PCT Pub. No.: WO2018/043470
PCT Pub. Date: Mar. 8, 2018

(65) Prior Publication Data
US 2021/0163788 A1 Jun. 3, 2021

(30) Foreign Application Priority Data

Sep. 5, 2016 (JP) .............................. JP2016-172727

(51) Int. Cl.
| | | |
|---|---|---|
| *C09J 5/00* | (2006.01) | |
| *C09J 175/00* | (2006.01) | |
| *B32B 7/00* | (2019.01) | |
| *B32B 27/00* | (2006.01) | |
| *B32B 37/00* | (2006.01) | |
| *C09J 5/04* | (2006.01) | |
| *B32B 7/12* | (2006.01) | |
| *B32B 27/08* | (2006.01) | |
| *B32B 27/32* | (2006.01) | |
| *B32B 37/12* | (2006.01) | |
| *C09J 175/06* | (2006.01) | |
| *C09J 175/08* | (2006.01) | |

(52) U.S. Cl.
CPC .................. *C09J 5/04* (2013.01); *B32B 7/12* (2013.01); *B32B 27/08* (2013.01); *B32B 27/32* (2013.01); *B32B 37/12* (2013.01); *C09J 175/06* (2013.01); *C09J 175/08* (2013.01); *B32B 2037/1269* (2013.01); *B32B 2250/02* (2013.01); *B32B 2250/242* (2013.01); *B32B 2307/412* (2013.01); *B32B 2307/518* (2013.01); *B32B 2323/10* (2013.01); *B32B 2553/00* (2013.01); *C09J 2475/00* (2013.01)

(58) Field of Classification Search
CPC ..... C09J 5/00; C09J 5/04; C09J 175/00; C09J 175/06; C09J 175/08; B32B 7/00; B32B 7/10; B32B 7/12; B32B 27/00; B32B 27/08; B32B 27/30; B32B 27/32; B32B 37/00; B32B 37/10; B32B 37/12
See application file for complete search history.

(56) References Cited

U.S. PATENT DOCUMENTS

2016/0185086 A1* 6/2016 Hsu ........................ B32B 27/36
428/201

FOREIGN PATENT DOCUMENTS

| | | |
|---|---|---|
| CN | 105705331 A | 6/2016 |
| DE | 4229953 A1 | 3/1994 |
| JP | H05-179207 A | 7/1993 |
| JP | 2013-043936 A | 3/2013 |
| JP | 2014-189639 A | 10/2014 |
| JP | 2016-097507 A | 5/2016 |
| WO | 15/017202 A1 | 2/2015 |

OTHER PUBLICATIONS

International Search Report dated Oct. 31, 2017, issued for PCT/JP2017/030888 and English translation thereof.
Written Opinion dated Oct. 31, 2017, issued for PCT/JP2017/030888.
Supplementary Search Report dated Mar. 24, 2020, issued for the European Patent Application No. 17846475.6.

* cited by examiner

*Primary Examiner* — Jacob T Minskey
*Assistant Examiner* — Matthew Hoover
(74) *Attorney, Agent, or Firm* — Locke Lord LLP

(57) ABSTRACT

A method for producing a flexible packaging film including a substrate and a polyurethane adhesive that is applied to the substrate and is a mixture of an A agent and a B agent includes a two-part separate application step that includes bringing a mixture of the A agent and B agent applied to one substrate into contact with a catalyst applied to another substrate and pressing the substrates, wherein the A agent is a polyisocyanate compound, and the B agent is a polyol compound. The polyol compound is preferably a polymer polyol comprising a polyether polyol or a polyester polyol as an essential component.

16 Claims, No Drawings

METHOD FOR MANUFACTURING FLEXIBLE PACKAGING FILM

TECHNICAL FIELD

The present invention relates to a method for producing a flexible packaging film, and particularly relates to a method including the step of separately applying a catalyst.

BACKGROUND ART

Conventionally, as an adhesive for flexible packaging film, two-part curing polyurethane resin adhesives have been widely used.

A plastic film for flexible packaging has been subjected to backing printing, and an adhesive is applied to the ink surface of the plastic film and another plastic film is laminated on the applied adhesive, and therefore the ink avoids excellent finishing for the appearance of the plastic film, and an improvement of the appearance of the film is desired.

Further, with respect to the flexible packaging material using a plastic laminate, hard texture is acceptable, and a flexible packaging material having a harder adhesive film more likely has excellent texture, and such products of the packaging materials are strongly desired.

Further, there are performances desired from the viewpoint of the improvement of the production efficiency for the flexible packaging film. For example, an improvement of fast-curing performance or an improvement of initial tack performance suppresses the occurrence of a tunneling phenomenon or enables three-layer lamination, and hence such performances are desired for the two-part curing polyurethane resin adhesive.

Generally, a common method for applying a two-part curing polyurethane resin adhesive to a film substrate for flexible packaging includes preparing a premix containing premixed components except for a polyisocyanate compound; mixing the premix with the polyisocyanate compound to form an adhesive composition; and applying the adhesive composition to a substrate (see, for example, paragraph 0029 of PTL 1). This method, however, has a disadvantage in that the isocyanate component having high reactivity causes the pot life to be extremely short, making difficult the adhesive design for improving the fast-curing performance or initial tack performance.

CITATION LIST

Patent Literature

PTL 1: JP-A-2014-189639

SUMMARY OF INVENTION

Technical Problem

A task of the present invention is to provide a method for producing a flexible packaging film, which is advantageous in that, by separately applying only a catalyst, the adhesive has an extended pot life and exhibits high curing rate, making it possible to improve the production efficiency.

Solution to Problem

The present inventors have conducted extensive and intensive studies with a view toward solving the above-mentioned problems. As a result, the present inventors have found a method for producing a flexible packaging film including a substrate and a polyurethane adhesive that is applied to the substrate and is a mixture of an A agent and a B agent, the method including a two-part separate application step that includes bringing a mixture of the A agent and B agent applied to one material into contact with a catalyst applied to another material and pressing the materials, in which the A agent is a polyisocyanate compound, and the B agent is a polyol compound, and have completed the present invention.

Specifically, according to the present invention, there is provided a method for producing a flexible packaging film including a substrate and a polyurethane adhesive that is applied to the substrate and is a mixture of an A agent and a B agent, the method including a two-part separate application step that includes bringing a mixture of the A agent and the B agent applied to one substrate into contact with a catalyst applied to another substrate and pressing the substrates, wherein the A agent is a polyisocyanate compound, and the B agent is a polyol compound.

Further, the invention provides a flexible packaging material for food using a flexible packaging film obtained by the above-mentioned method.

Advantageous Effects of Invention

According to the invention, there can be provided a method for producing a flexible packaging film, which is advantageous in that the adhesive has an extended pot life and exhibits high curing rate, thus improving the production efficiency.

Description of Embodiments (A agent: Polyisocyanate compound)

As examples of the polyisocyanate compound used as an A agent in the invention, there can be mentioned organic compounds having at least two isocyanate groups in the molecule thereof.

Examples of organic polyisocyanate compounds include polyisocyanates, such as tolylene diisocyanate, xylylene diisocyanate, diphenylmethane diisocyanate, 1,6-hexamethylene diisocyanate, isophorone diisocyanate, 4,4'-methylenebis(cyclohexyl isocyanate), lysine diisocyanate, trimethylhexamethylene diisocyanate, 1,3-bis(isocyanatomethyl)cyclohexane, 1,5-naphthalene diisocyanate, and triphenylmethane triisocyanate; and derivatives (modification products) of the above polyisocyanates, such as adducts of the polyisocyanates, biurets of the polyisocyanates, and isocyanurates of the polyisocyanates.

The polyisocyanate compound used in the invention serves as a curing agent and can be appropriately selected and used, but may be either aromatic or aliphatic. Examples of polyisocyanate compounds preferably used in the invention include polyisocyanates, such as hexamethylene diisocyanate (HDI), isophorone diisocyanate (IPDI), and diphenylmethane diisocyanate (MDI).

With respect to the curing agent, when using solely the polyisocyanate compound (B), performance of the curing agent is exhibited, but, by positively using the polyisocyanate compound and the below-mentioned epoxy resin in combination, it is possible to impart a higher hydrolytic resistance to the cured film.

(B Agent: Polyol Compound)

With respect to the polyol compound used as a B agent in the invention, there is no particular limitation, but examples of polyol compounds include polymer polyols selected from polyester polyol, polyether polyol, polyurethane polyol, polyether ester polyol, polyester (polyurethane) polyol, polyether (polyurethane) polyol, polyester amide polyol, acryl polyol, polycarbonate polyol, polyhydroxyalkane, castor oil, and mixtures thereof.

Examples of polyester polyols include polyester polyols obtained by reacting a dibasic acid, such as terephthalic acid, isophthalic acid, adipic acid, azelaic acid, or sebacic acid, or a dialkyl ester or mixture thereof with a glycol, such as ethylene glycol, propylene glycol, diethylene glycol, butylene glycol, neopentyl glycol, 1,6-hexanediol, 3-methyl-1,5-pentanediol, 3,3'-dimethylolheptane, polyoxyethylene glycol, polyoxypropylene glycol, or polytetramethylene ether glycol, or a mixture thereof; and polyester polyols obtained by subjecting a lactone, such as polycaprolactone, polyvalerolactone, or poly(β-methyl-γ-valerolactone), to ring-opening polymerization.

Examples of polyether polyols include polyether polyols obtained by polymerizing an oxirane compound, such as ethylene oxide, propylene oxide, butylene oxide, or tetrahydrofuran, using water or a low molecular-weight polyol, such as ethylene glycol, propylene glycol, trimethylolpropane, or glycerol, as an initiator. Examples of polyether ester polyols include polyether ester polyols obtained by reacting a dibasic acid, such as terephthalic acid, isophthalic acid, adipic acid, azelaic acid, or sebacic acid, or a dialkyl ester or mixture thereof with the above-mentioned polyether polyol.

As examples of polyurethane polyols, there can be mentioned polyols having a urethane bond per molecule, which are reaction products of a polyether polyol having, for example, a number average molecular weight of 200 to 20,000 and an organic polyisocyanate, and which preferably have NCO/OH of less than 1, more preferably 0.9 or less. As the organic polyisocyanate, the below-mentioned polyisocyanate compounds, particularly, diisocyanate compounds can be used.

As examples of polyether (polyurethane) polyols and polyester (polyurethane) polyols, there can be mentioned reaction products of a polyester polyol, a polyether ester polyol or the like and an organic polyisocyanate, which preferably have NCO/OH of less than 1, more preferably 0.9 or less.

The polyester amide polyol is obtained by, for example, further using an aliphatic diamine having an amino group, such as ethylenediamine, propylenediamine, or hexamethylenediamine, as a raw material in the above-mentioned esterification reaction.

Examples of acryl polyols include those which are obtained by copolymerizing hydroxyethyl acrylate, hydroxypropyl acrylate, or hydroxybutyl acrylate, each having at least one hydroxyl group per molecule, or a derivative of the corresponding methacrylic acid with, for example, acrylic acid, methacrylic acid, or an ester thereof.

Examples of polycarbonate polyols include those which are obtained by a reaction of one, or two or more glycols selected from ethylene glycol, propylene glycol, 1,4-butanediol, 1,5-pentanediol, 1,6-hexanediol, 3-methyl-1,5-pentanediol, 1,9-nonanediol, 1,8-nonanediol, neopentyl glycol, diethylene glycol, dipropylene glycol, 1,4-cyclohexanediol, 1,4-cyclohexanedimethanol, bisphenol A, and hydrogenated bisphenol A with dimethyl carbonate, diphenyl carbonate, ethylene carbonate, phosgene, or the like.

Examples of polyhydroxyalkanes include butadiene and liquid rubbers obtained by copolymerizing butadiene with acrylamide or the like.

Of these, polyether (polyurethane) polyol is especially preferred.

Further, as the polyol compound used in the invention, there can be also preferably used a reaction product of a polyisocyanate and a bis(hydroxyalkyl)amine, which product has an urea bond group at the end thereof.

The proportion of the polyol compound and polyisocyanate compound incorporated is designed so that the equivalent ratio [(b)/(a)] of the hydroxyl group equivalent (a) of the polyol compound, in terms of solids, and the isocyanate equivalent (b) of the polyisocyanate compound, in terms of solids, becomes 0.5 to 4.0, more preferably 0.9 to 3.0. Details of the production are described in the Examples.

The adhesive used in the invention, if necessary, may contain another additive other than the above-mentioned components. As examples of additives, there can be mentioned additives generally used in a resin composition for forming a film, a coating film or the like. Examples of such additives include colloidal silica; inorganic fine particles, such as an alumina sol; polymethyl methacrylate organic fine particles; an anti-foaming agent; an anti-sagging agent; a silane coupling agent; a viscosity modifier; an ultraviolet light absorber; a metal deactivator; a peroxide decomposer; a flame retardant; a reinforcing agent; a plasticizer; a lubricant; a rust preventive agent; a fluorescent brightener; an inorganic heat ray absorber; a flameproofing agent; an antistatic agent; and a dehydrating agent.

The adhesive used in the invention can be generally prepared by premixing components except the polyisocyanate compound as the A agent to prepare a premix as the B agent, and mixing the premix with the polyisocyanate compound as the A agent.

Further, for the purpose of accelerating the adhesive properties and curing, an epoxy group-containing compound may be incorporated into the adhesive, and there is a case where, as an epoxy group-containing compound, a compound, such as triglycidyl tris(2-hydroxyethyl) isocyanurate, neopentyl glycol diglycidyl ether, 1,6-hexanediol diglycidyl ether, acryl glycidyl ether, 2-ethylhexyl glycidyl ether, phenyl glycidyl ether, phenol glycidyl ether, p-t-butylphenyl glycidyl ether, diglycidyl adipate, diglycidyl o-phthalate, glycidyl methacrylate, or butyl glycidyl ether, or an oligomer containing an epoxy group and having a molecular weight of several hundred to several thousand, or a polymer containing an epoxy group and having a weight average molecular weight of several thousand to several hundred thousand is incorporated into the adhesive.

<Other Additives>

In the invention, as another additive, there can be used a thermoplastic elastomer, a tackifier, a catalyst, a phosphoric acid compound, a melamine resin, or a reactive elastomer, which are known and commonly used. The amount of the above additive contained is appropriately selected and the additive can be used in such an amount that the function of the adhesive in the invention is not sacrificed.

<Film>

As examples of the films used in the invention, there can be mentioned paper, a plastic film, a deposited metal film, and metal foils, such as a copper foil and an aluminum foil. The plastic film comprises an organic polymer resin, and is a biaxially oriented film obtained by melt-extruding the resin and then orienting the resultant film in the longitudinal direction and/or width direction, and further subjecting the oriented film to heat-setting and cooling, or a cast film obtained by melt-extruding the resin and then subjecting the resultant film, which is not oriented, to heat-setting and cooling. Examples of organic polymer resins include an olefin resin, an acrylonitrile-butadiene-styrene copolymer (ABS resin), a polyvinyl chloride resin, a fluororesin, a poly(meth) acrylic resin, a carbonate resin, a polyamide resin, a polyimide resin, a polyphenylene ether resin, and a polyphenylene sulfide resin. Examples of biaxially oriented films include synthetic resin films obtained from a polyester resin, such as polyethylene terephthalate (PET), biaxially oriented polypropylene (OPP), polyvinylidene chloride coated OPP (KOP), nylon (NY), polyvinylidene chloride coated nylon, polyvinyl chloride, polyvinyl alcohol, and biaxially oriented polystyrene (OPS). Examples of cast films include LDPE (low-density polyethylene), LLDPE (linear low-density polyethylene), MDPE (medium-density polyethylene), HDPE (high-density polyethylene), EVA (ethylene-vinyl acetate copolymer), and CPP (cast polypropylene). With respect to these organic polymer resins, another organic monomer in a small amount may be copolymerized with the organic polymer resin, or another organic polymer may be blended with the organic polymer resin.

Further examples include films having a deposited film on the above-mentioned plastic film, such as aluminum deposited PET, silica deposited PET, alumina deposited PET, and aluminum deposited CPP.

With respect to the transparency of the film, there is no particular limitation, but, when the film is required to have transparency, the film having a light transmittance of 50% or more is preferred. Prior to the lamination of an organic layer or an inorganic layer on the plastic film, the plastic film may be subjected to surface treatment, such as a corona discharge treatment, a plasma discharge treatment, a flame treatment, or a surface roughening treatment, or a known anchor coat treatment, printing, decoration, or the like.

Further, the thickness of the film is preferably in the range of from 3 to 500 µm, more preferably in the range of from 6 to 300 µm.

The polyurethane adhesive used in the invention is, for example, dissolved or dispersed in an organic solvent having a high dissolving power, such as an ester solvent, a ketone solvent, an aromatic hydrocarbon, an aliphatic hydrocarbon, or an alicyclic hydrocarbon, or in a dispersing medium in an arbitrary proportion, and an adhesive layer can be formed from the resultant solution or dispersion using a known application method, such as die coating, lip coating, gravure coating, direct reverse gravure coating, kiss reverse gravure coating, non-solvent coating, roll coating, reverse coating, knife coating, doctor coating, slide coating, wire bar coating, or extrusion coating.

Alternatively, the polyurethane adhesive used in the invention can be used in the form of an adhesive of a so-called solvent-free type that does not contain an organic solvent having a high dissolving power, such as an ester solvent, a ketone solvent, an aromatic hydrocarbon, an aliphatic hydrocarbon, or an alicyclic hydrocarbon.

With respect to the coating weight of the polyurethane adhesive used in the invention onto a film, there is no particular limitation, but, for example, the coating weight is 0.1 to 10 g/m², especially, preferably selected from the range of from 0.1 to 5.0 g/m² from the viewpoint of enabling the polyurethane adhesive in a small amount to impart excellent weathering resistance and the like.

In the invention, when the coating weight of the polyurethane adhesive is less than 0.1 g/m², a problem is caused in the continuous and uniform application properties. On the other hand, when the coating weight is more than 10.0 g/m², solvent removal from the polyurethane adhesive after applied is poor, so that the working properties become extremely poor and further a problem of residual solvent occurs.

<Two-Part Separate Application Step>

In the invention, the separate application step is a two-part separate application step in which the adhesive used according to the invention comprises: a mixture of an A agent and a B agent; and a catalyst for accelerating a urethane formation reaction and which includes bringing the mixture of the A agent and the B agent applied to one material into contact with the catalyst applied to another material and pressing the materials, in which the A agent is the polyisocyanate compound described above, and the B agent is the polyol compound described above.

With respect to the catalyst used in the invention, there is no particular limitation as long as it is a catalyst for accelerating a urethane formation reaction, but, for example, a metal catalyst, an amine catalyst, or a catalyst, such as diazabicycloundecene (DBU), an aliphatic cyclic amide compound, or a titanium chelate complex, can be used.

Examples of metal catalysts include metal complex catalysts, inorganic metal catalysts, and organometallic catalysts, and specific examples of metal complex catalysts include acetylacetonate salts of a metal selected from the group consisting of Fe (iron), Mn (manganese), Cu (copper), Zr (zirconium), Th (thorium), Ti (titanium), Al (aluminum), and Co (cobalt), for example, iron acetylacetonate, manganese acetylacetonate, copper acetylacetonate, and zirconium acetylacetonate. Of these, from the viewpoint of the toxicity and catalytic activity, preferred is iron acetylacetonate (Fe(acac)$_3$) or manganese acetylacetonate (Mn(acac)$_2$).

Examples of inorganic metal catalysts include catalysts selected from Fe, Mn, Cu, Zr, Th, Ti, Al, Co and the like.

Examples of organometallic catalysts include stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, nickel octylate, nickel naphthenate, cobalt octylate, cobalt naphthenate, bismuth octylate, and bismuth naphthenate. Of these, preferred compounds are organotin catalysts, and further preferred are stannous dioctoate and dibutyltin dilaurate.

With respect to the tertiary amine catalyst, there is no particular limitation as long as it is a compound having the above-mentioned structure, but, examples of tertiary amine catalysts include triethylenediamine, 2-methyltriethylenediamine, quinuclidine, and 2-methylquinuclidine. Of these, preferred are triethylenediamine and 2-methyltriethylenediamine because they have excellent catalytic activity and are commercially available.

Examples of other tertiary amine catalysts include N,N,N',N'-tetramethylethylenediamine, N,N,N',N'-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylhexamethylenediamine, bis(2-dimethylaminoethyl) ether, dimethylethanolamine, dimethylisopropanolamine, dimethylaminoethoxyethanol, N,N-dimethyl-N'-(2-hydroxyethyl)ethylenediamine, N,N-dimethyl-N'-(2-hydroxyethyl)propanediamine, bis(dimethylaminopropyl)amine, bis(dimethylaminopropyl)isopropanolamine, 3-quinuclidinol, N,N,N',N'-tetramethylguanidine, 1,3,5-tris(N,N-dimethylaminopropyl)hexahydro-S-triazine, 1,8-diazabicyclo[5.4.0]undecene-7, N-methyl-N'-(2-dimethylaminoethyl)piperazine, N,N'-dimethylpiperazine, dimethylcyclohexylamine, N-methylmorpholine, N-ethylmorpholine, 1-methyl imidazole, 1,2-dimethylimidazole, 1-isobutyl-2-methylimidazole, 1-dimethylaminopropylimidazole, N,N-dimethylhexanolamine, N-methyl-N'-(2-hydroxyethyl)piperazine, 1-(2-hydroxyethyl)imidazole, 1-(2-hydroxypropyl)imidazole, 1-(2-hydroxyethyl)-2-methylimidazole, and 1-(2-hydroxypropyl)-2-methylimidazole.

Examples of aliphatic cyclic amide compounds include δ-valerolactam, ε-caprolactam, ω-enantholactam, η(-capryllactam, and β-propiolactam. Of these, from the viewpoint of excellent curing accelerating effect, preferred is ε-caprolactam.

The titanium chelate complex is a compound which is increased in the catalytic activity by ultraviolet light irradiation, and a titanium chelate complex having an aliphatic or aromatic diketone as a ligand is preferred in view of having excellent curing accelerating effect. Further, in the invention, a titanium chelate complex having an alcohol having 2 to 10 carbon atoms as well as an aromatic or aliphatic diketone as a ligand is preferred from the viewpoint of causing the effects of the invention to be more remarkable.

In the invention, the catalysts may be used individually or in combination.

The amount of the catalyst used is 0.001 to 10 parts, preferably 0.01 to 10 parts, relative to 100 parts of the polyol compound in the B agent in the adhesive applied to another substrate.

The catalyst can be used in the application step in the form of a solution or a dispersion, and examples of solvents include alcohols, such as ethylene glycol, diethylene glycol, dipropylene glycol, propylene glycol, and butanediol; hydrocarbons, such as mineral turpentine; solvents capable of forming a chelate compound, e.g., β-diketones, such as acetylacetone and a fluorine-substituted product thereof, and ketoesters, such as methyl acetoacetate and ethyl acetoacetate; and organic solvents capable of forming a chelate compound, e.g., β-diketones, such as acetylacetone and a fluorine-substituted product thereof, and ketoesters, such as methyl acetoacetate and ethyl acetoacetate, and examples of plasticizers include phthalates, such as dioctyl phthalate, diisononyl phthalate, isodecyl phthalate, and dibutyl phthalate; adipates, such as dioctyl adipate and diisononyl adipate; and sebacates, and the catalyst can be used in the form of a solution or a dispersion in a polyol, such as polyethylene polyol or polypropylene polyol, or the polyol compound in the invention or the like. Further, it is desired that the catalyst is preliminarily mixed with a polyol, an isocyanate, or a prepolymer and then used.

It is preferred that the laminate having applied the adhesive used in the invention, after being prepared, is subjected to aging. Conditions for the aging are those at room temperature to 100° C. for 12 to 240 hours, and a curing reaction proceeds during the aging.

The mixture of the A agent and B agent is applied to one substrate, and then a catalyst is applied to another substrate, and the substrates are put together and pressed, so that the mixture of the A agent and B agent is contacted with the catalyst to cause a reaction. As a method for pressing, preferred is a method in which the substrates are laminated by dry lamination (dry lamination method), and the temperature of laminating rolls is preferably room temperature to about 120° C., and the pressure is preferably about 3 to 300 kg/cm$^2$. Thus, a flexible packaging film can be obtained.

It is preferred that the flexible packaging film obtained in the invention, after being produced, is subjected to aging. Conditions for the aging are such that the preferred temperature is 25 to 80° C., and the time is 12 to 240 hours, and an adhesive strength is caused during the aging. The laminate in the invention can be used as, for example, a laminate for packaging.

By the method for producing a flexible packaging film of the invention, a flexible packaging film having improved laminated film appearance and having improved flexible packaging texture can be produced, and therefore the obtained flexible packaging film can be used as a packaging material for food. The flexible packaging film can be industrially used as other various types of packaging materials.

EXAMPLES

Hereinbelow, the present invention will be described in detail with reference to the following Examples.

Example 1

A mixture (hereinafter, referred to as "adhesive mixture (1)") of aromatic polyether isocyanate 2K-SF-220A (A agent) and polyether polyol HA-220B (B agent), each of which is manufactured by DIC Corporation, was applied as an adhesive at 1.5 g/m$^2$ onto a 20 μm OPP (biaxially oriented polypropylene) film which had been printed. On the other hand, a mixture of 6 parts of ε-caprolactam and 94 parts of HA-220B was applied as a catalyst liquid at 0.2 g/m$^2$ onto 30 μm CPP (cast polypropylene), and the applied surfaces of the respective films were put together and pressed using nip rolls (nip rolls temperature: 50° C.) to produce a plastic film laminate. The pressing speed was 200 m/min, and the adhesive coating weight was 1.7 g/m$^2$.

The amounts of the agents were controlled so that the ratio of 2K-SF-220A and HA-220B incorporated became 10/7.

Example 2

A plastic film laminate was produced in substantially the same manner as in Example 1 except that, as a catalyst liquid applied to the 30 μm CPP (cast polypropylene), a mixture of 1 part of a photo-latent titanium catalyst, 5 parts of ε-caprolactam, and 94 parts of HA-220B was applied at 0.2 g/m$^2$.

Example 3

A plastic film laminate was produced in substantially the same manner as in Example 1 except that, as a catalyst liquid applied to the 30 μm CPP (cast polypropylene), a mixture of 0.4 part of dibutyltin dilaurate and 99.6 parts of HA-220B was applied at 0.2 g/m$^2$.

Example 4

A plastic film laminate was produced in substantially the same manner as in Example 1 except that, as a catalyst liquid applied to the 30 μm CPP (cast polypropylene), a mixture of 1 part of a photo-latent titanium catalyst, 5 parts of ε-caprolactam, and 94 parts of HA-220B was applied at 0.4 g/m$^2$, and that the pressing speed was 200 m/min and the adhesive coating weight was 1.9 g/m$^2$.

Example 5

A plastic film laminate was produced in substantially the same manner as in Example 1 except that, as a catalyst liquid applied to the 30 μm CPP (cast polypropylene), a mixture of 1 part of a photo-latent titanium catalyst, 5 parts of ε-caprolactam, and 94 parts of HA-220B was applied at 0.1 g/m², and that the pressing speed was 200 m/min and the adhesive coating weight was 1.5 g/m².

Comparative Example 1

The adhesive mixture (1), which is a mixture of 2K-SF-220A (A agent) and polyether polyol HA-220B (B agent), was applied to the ink surface of a 20 μm OPP (biaxially oriented polypropylene) film which had been printed, and the applied surface and the corona treated surface of 30 μm CPP (cast polypropylene) were put together and pressed using nip rolls (nip rolls temperature: 50° C.) to produce a plastic film laminate. The pressing speed was 200 m/min, and the adhesive coating weight was 1.5 g/m². The amounts of the agents were controlled so that the ratio of 2K-SF-220 and HA-220B incorporated became 10/7.

Comparative Example 2

2K-SF-220A (A agent) was applied at 1.0 g/m² onto a 20 μm OPP (biaxially oriented polypropylene) film which had been printed. On the other hand, polyether polyol HA-220B (B agent) was applied at 0.7 g/m² onto 30 μm CPP (cast polypropylene), and the applied surfaces of the respective films were put together and pressed using nip rolls (nip rolls temperature: 50° C.) to produce a plastic film laminate. The pressing speed was 200 m/min, and the adhesive coating weight was 1.7 g/m².

Comparative Example 3

A mixture of 2K-SF-220A (A agent) at 1.0 g/m² and ε-caprolactam at 0.012 g/m² was applied onto a 20 μm OPP (biaxially oriented polypropylene) film which had been printed. On the other hand, polyether polyol HA-220B (B agent) was applied at 0.7 g/m² onto 30 μm CPP (cast polypropylene), and the applied surfaces of the respective films were put together and pressed using nip rolls (nip rolls temperature: 50° C.) to produce a plastic film laminate. The pressing speed was 200 m/min, and the adhesive coating weight was 1.7 g/m².

Comparative Example 4

2K-SF-220A (A agent) was applied at 1.0 g/m² onto a 20 μm OPP (biaxially oriented polypropylene) film which had been printed. On the other hand, a mixture of HA-220B (B agent) at 0.7 g/m² and ε-caprolactam at 0.012 g/m² was applied onto 30 μm CPP (cast polypropylene), and the applied surfaces of the respective films were put together and pressed using nip rolls (nip rolls temperature: 50° C.) to produce a plastic film laminate. The pressing speed was 200 m/min, and the adhesive coating weight was 1.7 g/m2.

The results of the evaluation of the pot life and curing rate during the production of the laminate are shown in Table 1.
(Method for Judgment)
(Formulation Control)
The criteria for judgment are as follows.
⊙: Formulation control is possible in advance in terms of a weight.
Δ: Formulation control is impossible unless a coating weight meter is used.
X: Formulation control is impossible.
(Pot Life)
According to the formulation of a coating method shown in Table 1 below, an adhesive was blended and, immediately after being blended, about 0.8 g of the adhesive was placed on the measuring site of a rheometer, and a viscosity was measured for 30 minutes at a temperature such that the viscosity of the adhesive immediately after being blended became about 1,000 mPa·s. From the viscosity value measured at the time of the start of the measurement and the viscosity value measured 30 minutes after the start, evaluation was made as follows.
Evaluation ⊙: The viscosity measured 30 minutes after the start is 1 to less than 2 times the viscosity of the blend at the time of the start.
Evaluation ◯: The viscosity measured 30 minutes after the start is 2 to less than 3 times the viscosity of the blend at the time of the start.
Evaluation Δ: The viscosity measured 30 minutes after the start is 3 to less than 4 times the viscosity of the blend at the time of the start.
Evaluation X: The viscosity measured 30 minutes after the start is 4 or more times the viscosity of the blend at the time of the start.
Acceptance limit: ◯ Or more excellent [0057]
(Curing Rate)
The plastic film laminate obtained after pressed was matured in an atmosphere at 40° C. for 24 hours, and then subjected to infrared absorption spectrum measurement in a transmission mode to measure an absorption spectrum ascribed to an isocyanate (around 2,270 cm⁻¹).
⊙: The isocyanate reaction ratio is 90% or more.
◯: The isocyanate reaction ratio is 80% or more.
Δ: The isocyanate reaction ratio is 70% or more.
X: The isocyanate reaction ratio is 50% or more.
Acceptance limit: ◯ Or more excellent

TABLE 1

|  | Coating liquid applied to OPP film and coating weight | Coating liquid applied to CPP film and coating weight | Formulation control | Pot life | Curing rate |
|---|---|---|---|---|---|
| Example 1 | Adhesive mixture (1)* 1.5 g/m² | Mixture of 6 parts of ε-caprolactam and 94 parts of HA-220B 0.2 g/m² | ◯ | ⊙ | ⊙ |
| Example 2 | Adhesive mixture (1) 1.5 g/m² | Mixture of 1 part of photo-latent titanium catalyst, 5 parts of ε-caprolactam, and 94 parts of HA-220B 0.2 g/m² | ◯ | ⊙ | ⊙ |
| Example 3 | Adhesive mixture (1) 1.5 g/m² | Mixture of 0.4 part of dibutyltin dilaurate and 99.6 parts of HA-220B 0.2 g/m² | ◯ | ⊙ | ⊙ |

TABLE 1-continued

| | Coating liquid applied to OPP film and coating weight | Coating liquid applied to CPP film and coating weight | Formulation control | Pot life | Curing rate |
|---|---|---|---|---|---|
| Example 4 | Adhesive mixture (1) 1.5 g/m² | Mixture of 6 parts of ε-caprolactam and 94 parts of HA-220B 0.4 g/m² | ○ | ⊙ | ⊙ |
| Example 5 | Adhesive mixture (1) 1.5 g/m² | Mixture of 6 parts of ε-caprolactam and 94 parts of HA-220B 0.1 g/m² | ○ | ⊙ | ○ |
| Comparative Example 1 | Adhesive mixture (1) 1.5 g/m² | None | ○ | ○ | Δ |
| Comparative Example 2 | 2K-SF220A 1.0 g/m² | HA-220B 0.7 g/m² | Δ | ⊙ | Δ |
| Comparative Example 3 | Mixture of 2K-SF220A 1.0 g/m² and ε-caprolactam 0.012 g/m² | HA-220B 0.7 g/m² | Δ | ⊙ | ○ |
| Comparative Example 4 | 2K-SF220A 1.0 g/m² | Mixture of HA-220B 0.7 g/m² and ε-caprolactam 0.012 g/m² | Δ | ⊙ | ○ |

The abbreviations and shown in Table 1 indicate the followings.
OPP: Biaxially oriented polypropylene
CPP: Cast polypropylene
*1: Adhesive mixture (1) means a mixture of aromatic polyether isocyanate 2K-SF-220A (A agent) and polyether polyol HA-220B (B agent), each of which is manufactured by DIC Corporation.
2K-SF-220A: Aromatic polyether isocyanate, manufactured by DIC Corporation
HA-220B: Polyether polyol, manufactured by DIC Corporation With respect to the flexible packaging film obtained by the method for producing a flexible packaging film of the invention having the separate application step, the pot life of the adhesive during the production of the film is extended and the curing rate is high, and a method for producing such a flexible packaging film can be provided.

The invention claimed is:

1. A method for producing a flexible packaging film comprising a substrate and a polyurethane adhesive that is applied to the substrate and is a mixture of an A agent and a B agent, the method comprising:
a two-part separate application step that comprises bringing a mixture of the A agent and the B agent applied to one substrate into contact with a catalyst applied to another substrate and pressing the substrates, wherein the A agent is a polyisocyanate compound, and the B agent is a polyol compound.

2. The method for producing a flexible packaging film according to claim 1, wherein the polyol compound is a polymer polyol comprising a polyether polyol or a polyester polyol as an essential component.

3. The method for producing a flexible packaging film according to claim 1, wherein the polyisocyanate compound is an isocyanate compound having at least two isocyanate groups in the molecule thereof.

4. The method for producing a flexible packaging film according to claim 1, wherein the catalyst comprises at least one catalyst selected from a metal catalyst, an amine catalyst, a diazabicycloundecene catalyst, an aliphatic cyclic amide compound, and a titanium chelate complex.

5. The method for producing a flexible packaging film according to claim 1, wherein the substrate is a plastic film, a deposited metal film, or a metal foil.

6. The method for producing a flexible packaging film according to claim 2, wherein the polyisocyanate compound is an isocyanate compound having at least two isocyanate groups in the molecule thereof.

7. The method for producing a flexible packaging film according to claim 2, wherein the catalyst comprises at least one catalyst selected from a metal catalyst, an amine catalyst, a diazabicycloundecene catalyst, an aliphatic cyclic amide compound, and a titanium chelate complex.

8. The method for producing a flexible packaging film according to claim 3, wherein the catalyst comprises at least one catalyst selected from a metal catalyst, an amine catalyst, a diazabicycloundecene catalyst, an aliphatic cyclic amide compound, and a titanium chelate complex.

9. The method for producing a flexible packaging film according to claim 6, wherein the catalyst comprises at least one catalyst selected from a metal catalyst, an amine catalyst, a diazabicycloundecene catalyst, an aliphatic cyclic amide compound, and a titanium chelate complex.

10. The method for producing a flexible packaging film according to claim 2, wherein the substrate is a plastic film, a deposited metal film, or a metal foil.

11. The method for producing a flexible packaging film according to claim 3, wherein the substrate is a plastic film, a deposited metal film, or a metal foil.

12. The method for producing a flexible packaging film according to claim 4, wherein the substrate is a plastic film, a deposited metal film, or a metal foil.

13. The method for producing a flexible packaging film according to claim 6, wherein the substrate is a plastic film, a deposited metal film, or a metal foil.

14. The method for producing a flexible packaging film according to claim 7, wherein the substrate is a plastic film, a deposited metal film, or a metal foil.

15. The method for producing a flexible packaging film according to claim 8, wherein the substrate is a plastic film, a deposited metal film, or a metal foil.

16. The method for producing a flexible packaging film according to claim 9, wherein the substrate is a plastic film, a deposited metal film, or a metal foil.

* * * * *